April 2, 1957 D. C. COX 2,787,358
SEQUENTIAL DELIVERY OF ARTICLES
Filed June 9, 1953
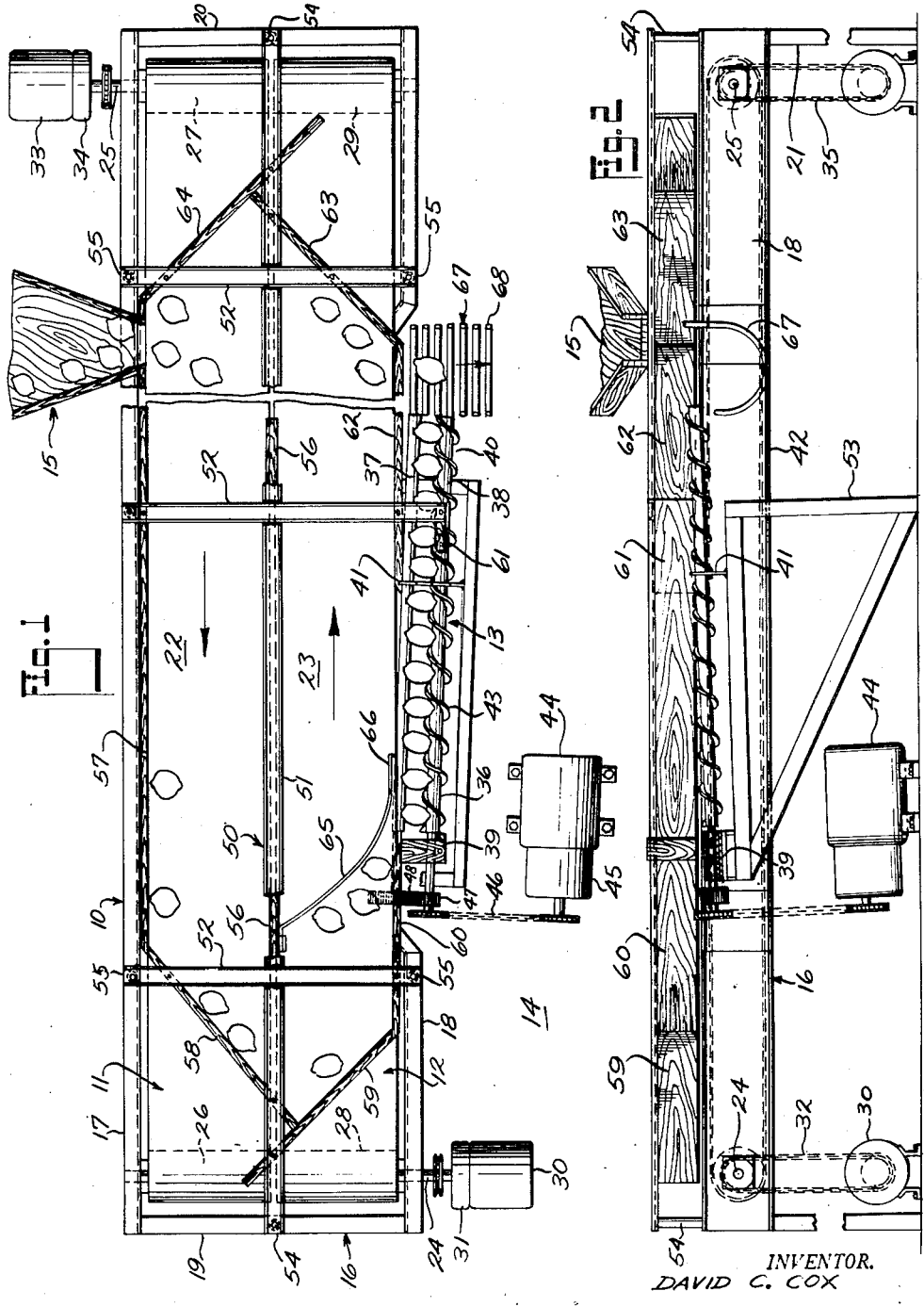
INVENTOR.
DAVID C. COX
BY
RICHEY, WATTS, EDGERTON & McNENNY
ATTORNEYS

United States Patent Office 2,787,358
Patented Apr. 2, 1957

2,787,358

SEQUENTIAL DELIVERY OF ARTICLES

David C. Cox, Grand Rapids, Mich., assignor to Electric Sorting Machine Company, Grand Rapids, Mich., a corporation of Michigan Application June 9, 1953, Serial No. 360,412

12 Claims. (Cl. 198—30)

This invention relates to assorting apparatus and, more particularly, to conveyors and the like for receiving fruit or other articles to be assorted, in bulk, and for delivering them one at a time to a sorting machine.

An object of the invention is to separate articles one from another and to deliver them in succession to a receiving apparatus and to do so with a minimum of damage to the articles.

Another object of the invention is to handle relatively tender articles such as ripe fruit and the like by continuously operating conveyors and to do so without damage to the fruit.

Still another object of the invention is to maintain a uniform rate of delivery of single specimens of fruit or the like to a sorting machine and to do so independently of the manner in which the fruit is received from prior processing operations.

There are described in my copending applications for U. S. patent, Serial No. 294,427, filed June 19, 1952 and related applications, Serial No. 326,496, filed December 17, 1952 and Serial No. 330,238, filed January 8, 1953, novel methods of and apparatus for inspecting fruit and the like according to the surface characteristics of each specimen such as, for example, by the color of the specimen. The fruit is inspected by a photoelectric system which illuminates each specimen and directs the reflected light upon a photoelectric device. The variations in photoelectric current or voltage due to the variations in color etc. are then utilized to control various diverter gates or the like for separating the fruit into different classes corresponding to the response from the photoelectric device.

The features and advantages of such sorting methods and apparatus are determined by the fact that the fruit is illuminated while falling freely in air and out of contact with supporting elements of any kind. The entire surface of each specimen of fruit can, therefore, be scanned and every variation in color and every blemish or fault on the surface of the specimen affects the photoelectric device and consequently the response thereof.

It is essential to the practical operation of an apparatus such as that described above that the specimens of fruit be handled extremely carefully both prior to and after the inspection operation. As set forth particularly in my above-referenced application, Serial No. 326,496, it is also necessary that the specimens to be inspected and sorted be delivered to the sorting machine in succession whereupon an apparatus which form a part of the sorting machine insures that the articles are delivered to the release mechanism of the machine at precisely timed intervals. The requirement of a delivery of the specimens to the sorting machine in succession is a difficult one, especially since the specimens must often be conveyed from a bulk storage means or, alternatively, directly from the picking and other prior processing operations.

The present invention is concerned with a unique and particularly advantageous conveying apparatus which functions to fulfill all the above-mentioned requirements. In particular, the invention includes two horizontal conveyors comprising two endless belts positioned adjacent each other and traveling in opposite directions. One of the belt conveyors receives the fruit and transfers it to the second belt conveyor. The specimens of fruit are then guided along a converging path to the feed end of a screw conveyor. A deflecting member serves to guide the specimens into the screw conveyor in substantially single file. The member which serves as a deflecting means has a small vertical extent above the conveyor so that in the event that an excessively large number of the articles are transferred to the second belt by the first belt, they may overrun the deflecting member and be returned to the first belt. It is thus an important feature of the invention that the conveying apparatus may receive the articles to be inspected in relatively large numbers and at different times and still deliver the articles to the sorting machine at a uniform rate.

This application is a continuation-in-part of applications, Serial No. 326,496, filed December 17, 1952 by David C. Cox and Floyd S. Smith, and Serial No. 64,967, filed December 13, 1948 and now Patent No. 2,656,923.

Other features and advantages more or less ancillary to the foregoing, and the manner in which all the various objects are realized, will appear in the following description which, considered in connection with the accompanying drawings, sets forth the preferred embodiment of the invention.

In the drawings,

Fig. 1 is a plan view showing the conveying apparatus of the invention; and

Fig. 2 is a side elevation view taken in the direction 2—2 of Fig. 1.

As shown in the figures, the illustrative embodiment of the invention comprises a conveying apparatus 10 including two horizontal conveyors 11 and 12, a screw conveyor 13 and drive apparatus 14. An ancillary feeder such as a chute 15 may be used to deliver the fruit to the apparatus.

The apparatus is mounted upon a main frame 16 which includes longitudinal frame members 17 and 18 and transverse members 19 and 20. The frame is supported by legs 21. The two horizontal conveyors 11 and 12 are supported within the members of the main frame and comprise two endless belts 22 and 23. The drive for the conveyor belts comprises two shafts 24 and 25 which are suitably mounted in bearings supported at the ends of the longitudinal frame members 17 and 18.

The conveyor belt 22 passes over pulleys 26 and 27 while the conveyor belt 23 passes over two pulleys 28 and 29, mounted upon the shafts 24 and 25, respectively. The pulley 26 is secured to the shaft 24, while the pulley 27 is arranged to run freely on the shaft 25 so that the conveyor belt may be driven from the shaft 24. A motor 30, a speed reducer 31, and a drive chain 32 are provided to drive the shaft 24 and the conveyor belt 22 at an appropriate speed. The conveyor 12 is similar to the conveyor 11 and the pulley 29 is secured to the shaft 25 while the pulley 28 runs freely upon the shaft 24. The shaft 25 is driven by the motor 33 through a speed reducer 34 and chain 35.

The shaft 24 is driven so that the upper side of the belt moves to the left. The right end of the belt is thus the feed end of the conveyor 11, while the left end of the belt is the delivery end of the conveyor. Similarly, the shaft 25 is driven so that the upper side of the belt 23 moves to the right. The left end of the conveyor 12 thus constitutes the feed end of the conveyor, while the right end of the belt constitutes the delivery end of the conveyor.

The screw conveyor 13 is mounted adjacent the outer edge of the belt 23 of the conveyor 12 and is adapted to receive the specimens of fruit from the belt at the feed end 36 thereof.

The screw conveyor 13 comprises two members 37 and 38 which constitute carrier rolls for supporting and moving the specimens. The roll members are supported at the feed end 36 of the conveyor by a bearing member 39 and toward the delivery end 40 of the conveyor by a second bearing member 41. The bearing members 39 and 40 are supported by a frame 53 and by the longitudinal frame member 18 which includes a portion 42 offset from the remainder of the member and disposed under the belt 23. The feed end of the conveyor 13 is mounted immediately adjacent and under the outer edge of the belt 23, while the delivery end of the conveyor may be spaced outwardly from the belt.

The roll member 38 carries a helical projection 43 on the outer surface thereof so that upon rotation of either the member 38 or both members 37 and 38, the specimens of fruit carried in the spaces formed by the successive portions of the projection and the roll 37 will be moved toward the delivery end 43 of the conveyor.

The screw conveyor 13 is driven by a motor 44 and speed reducer 45 through a drive chain 46. The roll members 37 and 38 are rotated in opposite directions by pinions 47 and 48 mounted at the extremities of the roll members.

Suitable members are provided to confine the specimens of fruit to a desired path on the conveyors and to prevent the specimens from falling to the floor. A frame 50 comprising a longitudinal member 51 and transverse members 52 are supported at the ends 54 and at the sides 55 thereof. A partition member 56 separates the conveyors 11 and 12 along a major portion of the length of the belts 27 and 28 and to prevent transfer of specimens between the conveyors except at the feed and delivery ends thereof.

Side members 57, 58, 59, 60, 61, 62, 63 and 64 serve as side boards for the conveyor belts and to deflect the specimens along the desired paths at the ends of the conveyor. The member 58 is directed diagonally across the belt 22 at the delivery end of the conveyor 11 and serves to deflect the specimens of fruit carried by the belt to the feed end of the delivery conveyor 12. Similarly, the member 63 at the delivery end of the conveyor 12 serves to deflect articles carried by the belt 23 to the feed end of the conveyor 11. The side boards 60, 61 and 62 serve to confine the movement of the specimens of fruit along the screw conveyor 13.

A deflecting member 65 is secured to the partition 56 and extends transversely across the belt 23 and for a slight distance along the feed end of the screw conveyor 13. The member 65 preferably has a very slight elevation above the belt 23 and may be formed of heavy spring wire or the like. Thus, if there is an excessive accumulation of specimens or fruit between the member 65 and the side board 60, some of the specimens may be carried over the members 62 and to the delivery end of the conveyor 12. The member 65 must, of course, be of sufficient size and stiffness so that the specimens of fruit are effectively directed into the delivery end of the screw conveyor. The end 66 of the member 65 tends to prevent pile-up of the specimens in the conveyor itself and to insure that all the carrying spaces of the conveyor are filled. The space between the end 66 of the member 65 and the side board 62 constitutes a return space for doubles.

In the present embodiment of the invention, the screw conveyor 13 delivers the fruit to the feed end of a reciprocating conveyor 67. Elements 68 of that conveyor are adapted to receive the specimens of fruit as they are forced from the delivery end 43 of the conveyor. It will be seen that the spacing of the projection 42 in the plane of the roll members 37 and 38 together with the speed of rotation of the member 38 will determine the rate at which the specimens are dropped into the conveyor 67. The conveyor 67 and the apparatus associated therewith is described in detail in application, Serial No. 326,496, to which reference has been made.

Any suitable means such as a chute 15 may be utilized to deliver the specimens to the conveyor 11. Alternatively, the pickers may dump the fruit directly over the side board 57 and onto the belt 22.

In operation, the fruit is carried by the conveyor belt 22 toward the delivery end of the conveyor 11 where the specimens are deflected onto the belt 23 by the diagonal member 58. The specimens are carried by the belt 23 and guided into the feed end 36 of the screw conveyor 13 by the side boards 59 and 60 and by the deflecting member 65. As mentioned above, any excessive accumulation of the fruit at the convergent positions of the members 60 and 65 will be carried by the belt 23 to the delivery end of the conveyor 12. The diagonal member 63 thereupon deflects the specimens to the feed end of the conveyor 11 and the entire process is repeated.

It will be seen that, by reason of the cooperation of the conveyors 12 and 13 and the side boards and deflecting member, the rate of delivery of the specimens at the delivery end of the screw conveyor 13 will be substantially constant and independent of the manner in which the fruit is delivered to the conveyor 11. This mode of operation constitutes a significant and advantageous feature of the invention.

It is to be understood that the specific nature of the present disclosure is not intended to be restrictive or confining and that various rearrangements of parts and modifications of design may be resorted to without departing from the scope or spirit of the invention as herein claimed.

What is claimed is:

1. Assorting apparatus for delivering articles one at a time comprising two belt conveyors, the belts of the conveyors being supported adjacent each other and adapted to be driven in opposite directions, the feed end of each conveyor being adjacent the delivery end of the remaining conveyor, means for delivering articles to the feed end of a first one of said conveyors, means at one end of the conveyors for deflecting articles from the delivery end of said first conveyor to the feed end of the second conveyor, a screw conveyor disposed along the belt of the second conveyor, means for deflecting at least some of the articles from the second belt conveyor into the screw conveyor, and a deflecting member at the remaining end of the conveyors extending transversely across the belt of the second conveyor having a slight vertical extent above the surface of the belt and disposed diagonally across the belt for deflecting the remaining articles from the delivery end of the second conveyor to the feed end of the first conveyor.

2. Assorting apparatus for delivering articles one at a time comprising two belt conveyors, the belts of the conveyors being supported adjacent each other and adapted to be driven in opposite directions, the feed end of each conveyor being adjacent the delivery end of the remaining conveyor, means for delivering articles to the feed end of a first one of said conveyors, means at one end of the conveyors for deflecting articles from the delivery end of said first conveyor to the feed end of the second conveyor, a screw conveyor disposed along the outer edge of the belt of the second conveyor, and directed in the direction of travel of the said belt conveyor, a deflecting member extending transversely across the belt of the second conveyor for deflecting at least some of the articles from the second belt conveyor into the screw conveyor, said deflecting member having a slight vertical extent above the surface of the belt of the second conveyor and disposed diagonally across the belt, and means at the remaining end of the conveyors for deflecting the remaining articles from the delivery end of the second conveyor to the feed end of the first conveyor.

3. Assorting apparatus for delivering articles one at a time comprising two belt conveyors, the belts of the conveyors being supported adjacent each other and adapted to be driven in opposite directions, the feed end of each conveyor being adjacent the delivery end of the remaining conveyor, means for delivering articles to the feed end of a first one of said conveyors, means at one end of the conveyors for deflecting articles from the delivery end of said first conveyor to the feed end of the second conveyor, a screw conveyor disposed along the outer edge of the belt of the second conveyor and directed in the direction of travel of the said belt conveyor, means for deflecting at least some of the articles from the second belt conveyor into the screw conveyor, and means at the remaining end of the conveyors for deflecting the remaining articles from the delivery end of the second conveyor to the feed end of the first conveyor, the deflecting means for the screw conveyor comprising a spring-like member having a slight vertical extent above the surface of the belt and disposed diagonally across the belt.

4. Conveyor apparatus comprising a horizontal conveyor having a feed end and a delivery end and including an endless belt, a screw conveyor positioned along the outer edge of said belt, a deflector positioned across the belt for forcing articles from the belt and into the feed end of the screw conveyor, the said deflector comprising a spring-like member substantially adjacent the upper surface of the belt for forcing articles into the screw conveyor and for permitting articles which do not move into the screw conveyor to continue along the belt, and means for transferring articles from the delivery end of the said horizontal conveyor to the feed end thereof, whereby the screw conveyor may remove articles from the horizontal conveyor at any predetermined rate.

5. Conveyor apparatus comprising a horizontal conveyor having a feed end and a delivery end and including an endless belt, a frame, spaced pulleys for supporting the endless belt, and means for driving the belt, a screw conveyor positioned along the outer edge of said belt, the said screw conveyor comprising two spaced rotating members, at least one of the members having a helical projection along the length and forming spaces with the members for carrying the articles, a deflector positioned across the belt for forcing articles from the belt and into the feed end of the screw conveyor, the said deflector comprising a spring-like member substantially adjacent the upper surface of the belt and extending somewhat along the conveyor for forcing articles into the successive spaces of the screw conveyor and for permitting articles which do not move into the screw conveyor to continue along the belt, and means for transferring articles from the delivery end of the said horizontal conveyor to the feed end thereof, whereby the screw conveyor may remove articles from the horizontal conveyor at any predetermined rate.

6. Conveyor apparatus comprising a horizontal conveyor having a feed and a delivery end and including an endless belt, means for transferring articles from the delivery end of said horizontal conveyor to the feed end thereof, and means positioned along the said horizontal conveyor intermediate the ends thereof for transferring articles in succession to a receiving apparatus spaced from the conveyor and including a screw conveyor comprising two spaced rotating members, at least one of said members having a helical projection along the length thereof, the said helical projection forming successive moving spaces for the articles with the two rotating members, and means for transferring articles from the said horizontal conveyor to the successive spaces of the said screw conveyor, said transferring means comprising a deflecting member having a slight vertical extent above the surface of the belt and disposed diagonally across the belt.

7. Conveyor apparatus comprising a horizontal conveyor having a feed end and a delivery end and including an endless belt, means for transferring articles from the delivery end of said horizontal conveyor to the feed end thereof, and means positioned along the said horizontal conveyor intermediate the ends thereof for transferring articles in succession to a receiving apparatus spaced from the conveyor and including a screw conveyor comprising two spaced rotating members, at least one of said members having a helical projection along the length thereof, the said helical projection forming successive moving spaces for the articles with the two rotating members, and means for transferring articles from the said horizontal conveyor to the successive spaces of the said screw conveyor, said last-named means comprising a spring-like member disposed diagonally across the belt and somewhat along the rotating members of the said screw conveyor and the said member having a relatively small elevation above the belt for permitting articles to overrun the member and to be returned to the feed end of the horizontal conveyor from the delivery end thereof.

8. A delivery apparatus for sorting machines comprising a frame, horizontal shafts at each end of said frame, each shaft carrying two pulleys and endless belts on the opposed pairs of pulleys, the said belts being driven in opposite directions, a screw conveyor positioned along the outer side of one of the said belt conveyors adapted to transfer articles from the belt to a receiving apparatus, a partition disposed between the said belts and along a substantial portion of the length thereof so as to form separate conveyors having the feed end of each conveyor disposed opposite the delivery end of the remaining conveyor, deflecting members directed across each of the belts at the delivery ends of each of the conveyors and extending to the entry end of the remaining conveyor and a deflecting member extending transversely across the second belt from the partition to the entry end of the screw conveyor for guiding articles to the screw conveyor, and support means for said partition and said deflecting members attached to said frame, the said partition and said deflecting members being suspended from the said support means.

9. A delivery apparatus for sorting machines comprising a frame, horizontal shafts at each end of said frame, each shaft carrying two pulleys and endless belts on the opposed pairs of pulleys, one of each of the said pulleys on each shaft being secured to the shaft for rotation therewith, and the associated pulley on the remaining shaft being free to rotate with respect to that shaft, a screw conveyor positioned along the outer side of one of the said belt conveyors and adapted to transfer articles from the belt to a receiving apparatus, a partition disposed between the said belts and along a substantial portion of the length thereof so as to form separate conveyors having the feed end of each conveyor disposed adjacent the delivery end of the remaining conveyor, deflecting members directed across each of the belts at the delivery ends of each of the conveyors and extending to the entry end of the remaining conveyor, a deflecting member extending transversely across the second belt from the partition to the entry end of the screw conveyor for guiding articles to the screw conveyor, and drive means for the said conveyors including means connected to each of the said shafts for rotating them in opposite directions.

10. A delivery apparatus for sorting machines comprising a frame, horizontal shafts at each end of said frame, each shaft carrying two pulleys and endless belts on the opposed pairs of pulleys, one of each of the said pulleys on each shaft being secured to the shaft for rotation therewith, and the associated pulley on the remaining shaft being free to rotate with respect to that shaft, a screw conveyor positioned along the outer side of one of the said belt conveyors and adapted to transfer articles from the belt to a receiving apparatus, the said screw conveyor comprising two rotating members, a partition disposed between the said belts and along a substantial portion of the length thereof so as to form separate conveyors having the feed end of each conveyor disposed adjacent the delivery end of the remaining conveyor, deflecting members directed across each of the belts at the delivery ends of each of the conveyors and extending to the entry end of the remaining conveyor, a deflecting member extending transversely across the second belt from the partition to the entry end of the screw conveyor for guiding articles to the screw conveyor, and drive means for the said conveyors including means connected to each of the said shafts for rotating them in opposite directions and means connected to the said screw conveyor members for rotating those members in opposite directions.

11. Apparatus for delivering articles comprising two horizontal belt conveyors, the belts of the conveyors being supported adjacent each other and adapted to be driven in opposite directions, the feed end of each conveyor being adjacent the delivery end of the remaining conveyor, means at one end of the conveyors for deflecting articles from a delivery end of a first conveyor to the feed end of the second conveyor, means at the remaining end of the conveyors for deflecting articles from the delivery end of the said second conveyor to the feed end of the first conveyor, means for delivering articles to one of the said conveyors, means intermediate the ends of the remaining conveyor for receiving articles therefrom, and a deflecting member extending transversely across the belt of the first conveyor with a slight vertical extent above the surface of the belt for guiding articles to the receiving means.

12. The combination of a sorting machine of the type adapted to inspect a succession of articles with conveyor means for delivering articles to the machine including a screw conveyor comprising two spaced rotating members, at least one of the members having a helical projection for moving articles along the members at a predetermined spacing, a horizontal conveyor including a moving belt disposed adjacent the end of the screw conveyor, and a deflector comprising a spring-like member having a relatively small elevation above the belt and being disposed diagonally across the belt and along the entry end of the screw conveyor for urging articles into the successive spaces formed by the helical projection with the rotating members while permitting the articles to overrun the member and remain on the horizontal conveyor.

References Cited in the file of this patent

UNITED STATES PATENTS

| | | |
|---|---|---|
| 1,355,184 | Taliaferro | Oct. 12, 1920 |
| 2,003,097 | Vickery | May 28, 1935 |
| 2,313,051 | Cutler | Mar. 9, 1943 |
| 2,459,264 | Cerruti | Jan. 18, 1949 |
| 2,515,404 | Grosvenor | July 18, 1950 |
| 2,620,059 | Niederer | Dec. 2, 1952 |
| 2,637,435 | Fahey | May 5, 1953 |
| 2,704,146 | Reck | Mar. 15, 1955 |